United States Patent [19]

Winslow et al.

[11] 4,313,191

[45] Jan. 26, 1982

[54] RECORDING MEDIUM HAVING A PILOT SIGNAL WITH AN ALIGNED PHASE ANGLE IN ADJACENT TRACKS

[75] Inventors: John S. Winslow, Altadena; Wayne R. Dakin, Redondo Beach, both of Calif.

[73] Assignee: Discovision Associates, Costa Mesa, Calif.

[21] Appl. No.: 136,130

[22] Filed: Mar. 31, 1980

Related U.S. Application Data

[62] Division of Ser. No. 920,701, Jun. 30, 1978, Pat. No. 4,236,050.

[51] Int. Cl.³ .................. G11B 7/24; G11B 19/24; G11B 23/36
[52] U.S. Cl. ........................ 369/275; 369/50; 369/61; 369/109; 358/128.5
[58] Field of Search .......................... 358/4–8, 358/127–132; 179/100.3 V, 100.4 E, 100.1 S, 100.1 G; 360/9–10, 33, 35, 73; 369/275, 109, 61, 50, 44

[56] References Cited

U.S. PATENT DOCUMENTS

| 3,796,825 | 3/1974 | Redlich et al. | 358/128.6 |
| 4,018,984 | 4/1977 | Keizer | 358/128.6 |
| 4,223,187 | 9/1980 | Yonezawa et al. | 358/128.5 |
| 4,223,347 | 9/1980 | Bouwhuis | 358/128.5 |

Primary Examiner—Raymond F. Cardillo, Jr.
Attorney, Agent, or Firm—Ronald J. Clark

[57] ABSTRACT

A recording medium, such as a light-reflective video disc, having a plurality of substantially parallel information tracks, each track formed by a succession of spaced, information-bearing indicia having reduced reflectivity. Each track records both a modulated carrier signal and a pilot signal, the pilot signal having a prescribed frequency substantially lower than a substantial portion of the modulated carrier signal. The duty cycle of the spaced indicia forming each track varies in accordance with the phase angle of the recorded pilot signal, and the pilot signal's phase angle is aligned with itself on adjacent tracks.

4 Claims, 3 Drawing Figures

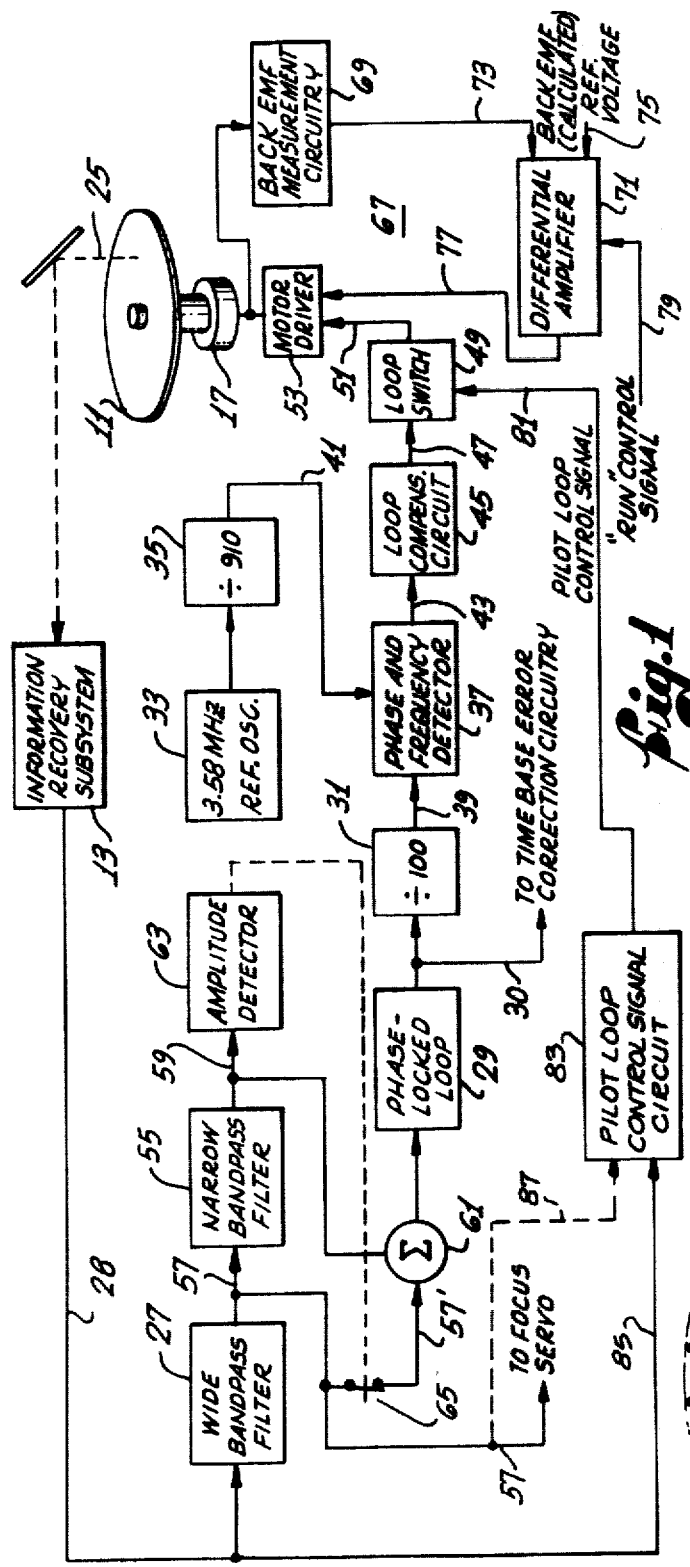
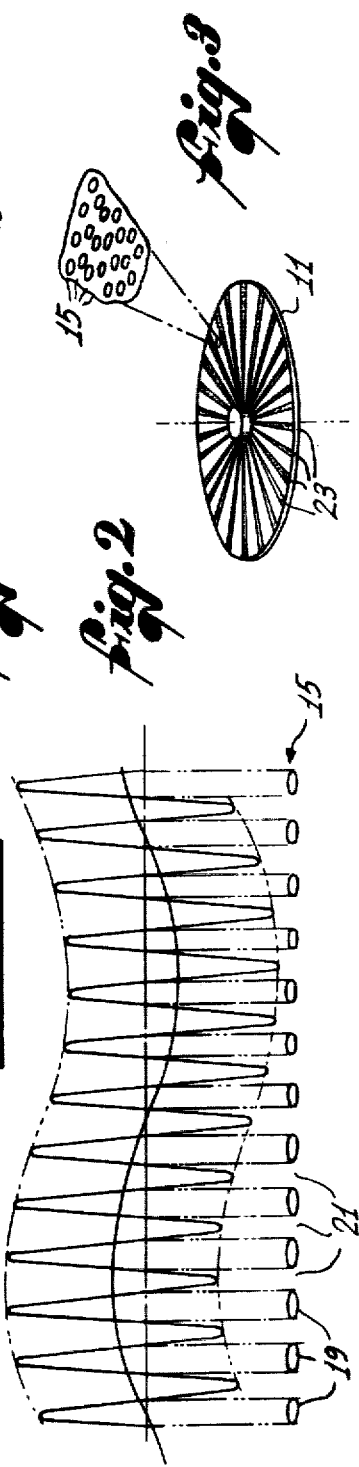
Fig.1  Fig.2  Fig.3

RECORDING MEDIUM HAVING A PILOT SIGNAL WITH AN ALIGNED PHASE ANGLE IN ADJACENT TRACKS

This is a division of application Ser. No. 920,701, filed June 30, 1978, now U.S. Pat. No. 4,236,050.

BACKGROUND OF THE INVENTION

This invention relates generally to information recording systems and, more particularly, to servo apparatus for moving an information storage medium, such as a disc, cylinder, or tape, relative to a device for recovering information therefrom.

An example of a servo apparatus of this particular type is disclosed in a co-pending and commonly assigned application for United States Patent, Ser. No. 890,670, filed in the name of R. Dakin et al and entitled "Video Disc Player". In that application, a system is described having a spindle motor for rotating a disc-shaped record carrier and a tachometer coupled to the spindle motor for producing a signal representative of its angular velocity. The servo apparatus is operable to lock the phase of the tachometer signal onto the phase of a locally generated reference signal.

The above system has not proven completely satisfactory, however, because the angular velocity of the spindle motor does not necessarily correlate precisely with the angular velocity of the record carrier relative to the information recovery device. Eccentricities in the shape of the record carrier and vibrations brought about by the relative movement cause undesired variations in the relative velocity of the particular information track being read. Moreover, the signal produced by the tachometer does not necessarily correlate precisely with the angular velocity of the motor, because of eccentricities and other defects in the tachometer, itself. Still another drawback to a system of this type arises because the cost of the tachometer and the manufacturing costs for mounting it are relatively high.

An example of an alternative servo apparatus of this particular type is disclosed in U.S. Pat. No. 3,350,503, issued in the name of D. P. Gregg and entitled "Electron Beam Recording and Reproducing System". The technique disclosed in this patent avoids the need for a tachometer, but in doing so, introduces other drawbacks. The apparatus disclosed includes a gun for directing an electron beam at a magnetic tape to read information recorded thereon, and means for controllably deflecting the beam longitudinally along the tape to compensate for variations in its relative velocity. The beam is deflected in accordance with a comparison of a local reference signal having a predetermined frequency and a pilot signal recovered from the tape. By this technique, the velocity of the actual tape relative to the electron beam can be precisely controlled, and the effects of tape speed variations, i.e., "flutter" and "wow", can be thereby minimized.

Although this latter servo technique has proven effective in some applications, it cannot by itself yield a constant velocity for the record medium in applications where the record medium has a plurality of parallel information tracks and the device for recovering the information recorded thereon is not always aligned with an individual track or is made to traverse the record medium from one track to another. Such non-critical positioning can occur, for example, when the information recovery device is not properly focused and is simultaneously reproducing information recorded on several adjacent tracks or when the device is not properly aligned with an individual track.

It will be appreciated from the foregoing that there is still a need for apparatus for precisely controlling the velocity of a record medium relative to a device for recovering information therefrom, which is operable even when the recovery device is not critically positioned with respect to an individual information track or is traversing the record medium from one track to another, and which can do so without undue complexity or cost. The present invention fulfills this need.

SUMMARY OF THE INVENTION

Basically, the invention resides in an improved servo apparatus and method for its use for controlling the velocity of an information storage medium relative to a device for recovering information recorded thereon. The storage medium includes a plurality of substantially parallel information tracks, each of such tracks bearing information that includes a pilot signal having a predetermined frequency. The servo apparatus is operable to synchronize the pilot signal reproduced by the information recovery device with a local reference signal having a frequency that corresponds to the desired relative velocity of the storage medium.

In accordance with the invention, the phase angle of the pilot signal recorded on the storage medium is aligned with itself on adjacent information tracks, whereby the servo apparatus can continue to control the relative velocity of the storage medium, even when the information recovery device is traversing the record medium from one track to another or is otherwise not critically positioned with respect to an individual information track.

More particularly, a servo apparatus constructed in accordance with the present invention is especially adaptable for use with an optically readable disc-shaped record carrier having a plurality of substantially parallel information tracks arranged in a spiral or in concentric circles. Recorded on the disc is a composite signal, which includes a summation of the pilot signal and other information preferably frequency modulated on a carrier. The composite signal is represented on the information tracks by a series of bumps and lands, and the frequency of the pilot signal is preferably substantially lower than that of the frequency modulated carrier. The pilot signal therefore effectively causes the duty cycle of the bumps and lands to vary above and below an average value, in a periodic fashion. As a result, the phase alignment of the pilot signal has the effect of creating a group of spaced radial "spokes", each such spoke corresponding to a region where the duty cycle of the recorded composite signal exceeds its average value.

The servo apparatus of the present invention includes a bandpass filter for separating the pilot signal from the remainder of the composite signal recovered from the record disc, followed by a phase-locked loop to remove unwanted noise and eliminate the occurrence of any signal dropouts. A phase and frequency detector compares the output of the phase-locked loop to the local reference signal, which has a frequency representative of the desired angular velocity for the disc, thereby producing an error signal that is utilized to drive a spindle motor for rotating the disc. The apparatus can further include means for reducing the bandwidth of the bandpass filter, thereby increasing the signal-to-noise ratio of the separated pilot signal, whenever it is determined that the angular velocity of the disc is within a predetermined range of the desired velocity.

In accordance with another aspect of the present invention, the servo apparatus can include a supplementary control loop for use in effecting a coarse control of the speed of the spindle motor during initial startup. The separate control loop includes means for continuously measuring both the voltage applied to the terminals of the spindle motor and the current drawn by the motor, and for utilizing these measurements to compute the "back emf" of the motor. A differential amplifier is then employed to compare this computed value to a predetermined reference voltage, and thereby produce an error signal for driving the motor. After the motor has achieved a predetermined angular velocity, a switch is actuated to initiate operation of the pilot signal control loop earlier described.

In accordance with still another aspect of the present invention the pilot signal recovered from the record medium can be used in apparatus for correcting time base errors that inevitably occur in the signal reproduced from the storage medium. These errors are commonly created by vibrations and eccentricities, or other defects, in the record medium. In this manner, time base errors can be corrected for even though the information recovery device may not be in proper alignment with an individual information track.

The pilot signal recovered from the record medium can also be used in combination with a system for acquiring focus, of the type described in the aforesaid application for United States Patent, Ser. No. 890,670. In that focusing system, a lens positioned over a record disc is initially retracted and then moved toward the disc in a linear fashion until focus is achieved. In accordance with one aspect of the present invention, the distance over which the lens need be moved can be reduced by limiting it to positions in which the pilot signal can be detected, any additional movement necessarily being in positions where proper focus could not be achieved. This substantially reduces the time period needed for initial acquisition of proper focus.

Other aspects and advantages of the present invention will become apparent from the following description of the preferred embodiment taken in conjunction with the accompanying drawings, which disclose, by way of example, the principles of the invention.

BRIEF DESCRIPTION OF THE DRAWINGS

FIG. 1 is a block diagram of a servo apparatus in accordance with the present invention, for controlling the angular velocity of a disc-shaped record medium;

FIG. 2 is a timing diagram (not necessarily to scale) showing a portion of a composite signal, which includes a pilot signal additively combined with a carrier signal, to be recorded on the disc, and showing the corresponding arrangement of bumps and lands formed on the disc; and FIG. 3 is a simplified perspective view of the record disc, showing a plurality of spaced radial spokes, which represent the periodic variations in the duty cycle of the composite signal recorded thereon.

DESCRIPTION OF THE PREFERRED EMBODIMENT

Referring now to the drawings, and particularly to FIG. 1, there is shown a servo apparatus for controlling the angular velocity of a disc-shaped record carrier 11 relative to a device 13 for recovering information recorded thereon. The information is recorded on the disc 11 on a series of substantially parallel information tracks 15 (FIG. 3) arranged in either a spiral or concentric circle pattern, and can include, for example, a conventional color television signal frequency modulated on a carrier, along with a pilot signal having a predetermined, constant frequency substantially lower than that of the modulated carrier. The servo apparatus operates to vary the angular velocity of a spindle motor 17 that rotates the disc 11 by synchronizing the frequency and phase angle of the pilot signal recovered from the disc with the frequency and phase angle of a locally generated reference signal having a frequency that corresponds to the desired angular velocity for the disc.

In accordance with the invention, the pilot signal recorded on the disc 11 includes the same integral number of cycles on each information track 15, whereby the phase angle of the pilot signal is aligned on adjacent tracks and the servo apparatus can continue to properly control the angular velocity of the disc even when the information recovery device 13 is not critically positioned with respect to an individual information track or is traversing the disc from one track to another.

In the preferred embodiment, the frequency modulated carrier signal is additively combined with the lower frequency pilot signal to form a composite signal for recording on the disc 11. FIG. 2 depicts a portion of this composite signal (not to scale), along with a corresponding arrangement of optically readable bumps 19 and lands 21 representing the signal as it is actually encoded on the disc. Suitable apparatus for recording such bumps and lands on a disc is disclosed in a commonly assigned application for United States Patent, Ser. No. 890,407, filed in the name of John S. Winslow and entitled "Mastering Machine" now U.S. Pat. No. 4,225,873.

It will be appreciated from FIG. 2 that the bumps 19 occur wherever the instantaneous composite signal exceeds a predetermined threshold. Selection of a threshold corresponding to the d.c. level of the signal will result in a nominal duty cycle of the recorded pattern of bumps and lands being 50 percent. It will be observed that the pilot signal will appear in the recorded pattern as a periodic variation in the duty cycle of the bumps 19 and lands 21. Positive portions of the pilot signal will result in a duty cycle that exceeds 50 percent, and negative portions of the pilot signal will result in a duty cycle that is less than 50 percent. In the preferred embodiment, the pilot signal has a magnitude approximately 35 db lower than that of the frequency modulated carrier signal and also has a substantially lower frequency, so as to reduce any interference with the modulated signal. Accordingly, it will be appreciated that the duty cycle variations above and below 50 percent will be slight.

When the carrier signal is being modulated by a conventional television signal, it is desirable that each information track 15, i.e., each revolution of the disc 11 contain the information for one video frame. Accordingly, for proper reproduction of the signal, the disc must be rotated at an angular velocity of about 1800 r.p.m. Use of a pilot signal having a frequency of about 400 KHz, then, results in approximately 13,000 cycles of the pilot signal being recorded on each track 15.

As depicted in FIG. 3, the cycles of the pilot signal, which are aligned with each other on adjacent information tracks 15, will appear as spaced radial spokes 23 on the disc 11. Each of the spokes corresponds to a portion of the pilot signal having a duty cycle greater than 50 percent, and the regions between the spokes correspond to the portions of the pilot signal having a duty cycle less than 50 percent.

As described in the aforementioned application for United States Patent, Ser. No. 890,407, the successive bumps 19 and lands 21 are preferably adapted to be alternatively light reflective and light non-reflective, whereby they can be properly detected by means of a laser beam, shown diagrammatically in FIG. 1 by a dotted line 25. When the laser beam is properly focused, it will impinge on a portion of the disc 11 having a diameter approximately equivalent to the width of a individual information track 15, and as the disc is rotated with respect thereto, a modulated reflected laser beam that corresponds to the recorded information will be produced.

On the other hand, when the laser beam 25 is not properly focused on the disc 11, a plurality of information tracks 15 will be illuminated simultaneously and the reflected laser beam will have an intensity that is modulated by the information recorded on all of those illuminated tracks. As a result, proper frequency demodulation of the modulated carrier signal can not generally be achieved.

The pilot signal, however, which is added to the frequency modulated carrier on each information track 15, has a phase angle that is aligned for all of the tracks illuminated. Accordingly, the intensity of the reflected laser beam 25 will be properly modulated by the pilot signal, even though the reflected beam is modulated by information recorded on a plurality of information tracks. The angular velocity of the disc 11 relative to the information recovery device 13 can therefore be precisely controlled, even though the laser beam of the device is not properly focused on an individual information track. Only when the laser beam is improperly focused to the extent that the portion of the disc illuminated has a size approaching the length of one cycle of the pilot signal, will the apparatus be unable to properly detect the pilot signal.

The servo apparatus of the present invention is also operable to control the angular velocity of the disc 11 when the information recovery device 13 is traversing the information tracks 15 of the disc in a rapid fashion, as, for example, when searching for a predetermined individual track. Since the phase angle of the pilot signal is in alignment on adjacent information tracks, the pilot signal reproduced by the information recovery device will not experience any substantial phase discontinuities during a traversing of the disc, and the servo apparatus will therefore maintain the recovered pilot signal properly phased-locked to the local reference signal.

Referring again to FIG. 1, the servo apparatus of the present invention includes a conventional wide band-pass filter 27, which receives on line 28 the signal reproduced by the information recovery device 13, and which then separates the pilot signal from the frequency modulated carrier signal. This is followed by a conventional phase-locked loop 29 for removing additional noise from the filtered pilot signal and for eliminating signal dropouts that can sometimes occur. The output of the phase-locked loop, which has a substantially constant amplitude and a frequency that corresponds to the angular velocity of the disc 11, is transmitted over line 30 to a divide-by-100 circuit 31.

The apparatus further includes a conventional 3.58 MHz oscillator 33 and a divide-by-910 circuit 35 for producing the aforementioned local reference signal, and a phase and frequency detector circuit 37 for comparing the local reference signal to the output of the divide-by-100 circuit 31 (i.e. the processed pilot signal recovered from the disc 11). The detector 37 produces an analog voltage signal that is proportional to the difference between the phase angles of the two signals, which are supplied to the detector over lines 39 and 41, respectively.

Additionally, the detector circuit 37 is operable to detect differences in the frequencies of the respective signals, and the level of the analog voltage signal is modified, accordingly. This insures that the servo apparatus will not lock the frequency of the recovered pilot signal onto a multiple or sub-multiple of the frequency of the reference signal. An example of a suitable phase and frequency detector is disclosed in an article entitled "Digital Control of Shaft Speed and Position", appearing in *IEEE Spectrum*, January 1968, pp. 90–95.

The analog output signal of the phase and frequency detector 37 is transmitted over line 43 to a loop compensation circuit 45, which provides the servo apparatus with a desired loop gain and bandwidth. The output of this compensation cuircuit 45 is transmitted over line 47 to a loop switch 49, and, in turn, over line 51 to a motor driver 53, which drives the spindle motor 17, accordingly.

In accordance with one aspect of the present invention, the servo apparatus can further include a narrow band-pass filter 55 for use in increasing the signal-to-noise ratio of the reproduced pilot signal when the spindle motor 17 is operating at an angular velocity very near the desired velocity. The narrow band-pass filter 55 is connected in series with the wide band-pass filter 27, receiving the output of the wide band-pass filter on line 57 and producing a filtered signal for output on line 59.

A summer 61 is included for summing the respective output signals of the wide band-pass filter 27 and the narrow band-pass filter 55, supplied over lines 57 and 59, respectively. Additionally, an amplitude detector 63 is included for determining when the output of the narrow band-pass filter exceeds a predetermined threshold, which indicates that the angular velocity of the disc 11 is close to its desired level. The detector 63 then opens a switch 65 to prevent the output signal of the wide band-pass filter from being summed by the summer. In the preferred embodiment, which is utilized with a pilot signal having a frequency of about 400 KHz, the wide band-pass filter has a bandwidth of approximately 120 KHz and the narrow band-pass filter has a bandwidth of approximately 10 KHz.

In another aspect of the invention, the servo apparatus includes a separate control loop 67 for use in achieving a coarse control of the angular velocity of the spindle motor 17 during initial startup of the record disc 11. This control loop functions to produce a predetermined back-emf in the spindle motor that corresponds to the desired angular velocity of the disc.

The back-emf control loop 67 includes a back-emf measurement circuit 69 which continuously monitors both the analog voltage and the analog current produced by the motor driver 53 and supplied to the spindle motor 17 and, using conventional techniques, computes the back-emf of the motor. A differential amplifier 71 is utilized to compare the computed back-emf voltage, supplied on line 73 from the emf circuit 69, to a predetermined selected reference voltage, supplied on line 75, and to produce a corresponding analog voltage for transmission over line 77 to the motor driver.

Operation of the back-emf control loop 67 is initiated upon receipt of a "RUN" control signal, transmitted on line 79 to the differential amplifier 71. After the emf control loop has operated alone for sufficient duration to bring the angular velocity of the record disc 11 to within a predetermined range of the desired velocity, a pilot loop control signal is transmitted over line 81 to the loop switch 49, to initiate operation of the control loop that utilizes the pilot signal. Both the back-emf loop and the pilot signal loop are then operable simultaneously, but the "loop gain" of the pilot signal loop is substantially greater, so the effect of the back-emf loop is minimal.

It will be appreciated that the pilot loop control signal supplied over line 81 for initiating operation of the pilot signal control loop can be generated in many ways. For example, it can be produced whenever the frequency modulated carrier signal reproduced by the information recovery device 13 is being properly demodulated, or, alternatively, whenever the pilot signal is being output by the wide band-pass filter 27. In either case, the signal occurs only when the frequency of the recovered pilot signal is near its desired level. Thus, as shown in FIG. 1, the pilot loop control signal is generated by a pilot loop control signal circuit 83, which monitors either the signal output by the information recovery device 13, coupled over a solid line 85, of the signal output by the wide band-pass filter 27, coupled over a dashed line 87.

The pilot signal recovered from the record medium can also be utilized in a time base error correction apparatus (not shown), which operates to compensate for timing variations in the reproduced signals, due to such factors as vibrations and eccentricities in the record medium. Typical apparatus for effecting a correction of time base errors is described in U.S. Pat. No. 4,087,176, issued in the name of A. J. Trost and entitled "Pilot Signal Processing Means for Video Recording Apparatus". The apparatus described therein includes means for variably delaying a video signal recovered by an information recovery device from a record carrier, to correct for time base variations detected therein. The amount by which the video signal is delayed is determined by differences in the phase angles of a local reference signal having a predetermined constant frequency and a pilot signal recovered from the record carrier.

In accordance with one aspect of the present invention, a time base correction apparatus of the general type described in the aforementioned Trost patent can be utilized in combination with a record medium having a plurality of substantially parallel information tracks on which a pilot signal is recorded, with the phase angle of the recorded pilot signal in alignment with itself on adjacent tracks. As a result, time base variations in the information recovered from the record medium can be readily corrected for, even though the information recovery device may be traversing the record medium from one information track to another or otherwise may not be precisely aligned with an individual track, since the pilot signal can still be detected in those situations.

In accordance with still another aspect of the present invention, the pilot signal reproduced from the record disc 11 can be utilized in a focus servo apparatus of the type described in the aforementioned application for U.S. patent, Ser. No. 890,670. In the focus servo apparatus described therein, a lens is positioned over a record disc for focusing a laser beam on an individual information track thereon. Initial focus is achieved by first retracting the lens fully, and then moving it toward the disc in a linear fashion, until it is determined that the proper lens position has been reached.

When the lens is fully retracted, it may be operating to illuminate a portion of the record disc 11 of such size that even the pilot signal cannot be detected (i.e., the illuminated disc region has a size greater than approximately one cycle of the pilot signal on the disc). In accordance with the invention, the time required to properly focus the lens is reduced by initially retracting the lens only as far as the pilot signal is still being detected, and initiating the linear movement of the lens toward the disc at that location. This prevents the apparatus from attempting to acquire focus for a range of lens locations in which proper focus cannot possibly be attained.

From the foregoing description, it should be apparent that the present invention provides an effective apparatus for contolling the angular velocity of a record disc relative to a read head of an information recovery device, operable even when the read head is not critically positioned with respect to an individual information track on the disc or is traversing the disc from one track to another. Moreover, this velocity control is achieved without the need for a relatively costly tachometer.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

We claim:

1. In a recording medium having information recorded thereon in a plurality of substantially circular and concentrically-arranged information tracks, said recording medium being a light-reflective disc and each information track including a sequence of spaced regions of non-reflectivity representative of the recorded information, said recording medium being suitable for use with playback apparatus that recovers the recorded information by focusing a beam of light onto a selected track as the medium is moved in a prescribed fashion, to produce a reflected beam having an intensity modulated by the recorded pattern of regions of non-reflectivity, for detection by an information recovery device, an improvement wherein the recorded information comprises a modulated carrier signal and a pilot signal, said pilot signal having a prescribed, constant frequency substantially lower than a substantial portion of the frequency components of the modulated carrier signal, wherein the recorded pilot signal includes a prescribed, integral number of cycles on each track and the phase angle of the pilot signal is aligned with itself on adjacent tracks, and wherein the duty cycle of the recorded pattern of regions of non-reflectivity varies in accordance with the phase of the pilot signal, whereby the playback apparatus can function to controllably adjust the speed of the recording medium relative to the focused beam of light such that the phase angle of the recovered pilot signal component is substantially synchronized with the phase angle of a locally-generated reference signal, even when the beam of light is improperly focused on the recording medium such that the reflected beam is modulated by information recorded on more than a single information track, simultaneously, and even when the beam of light is traversing the recording medium from one track to another.

2. A recording medium comprising:
   a body having a plurality of substantially parallel information tracks formed by a succession of spaced indicia having a different effect on an impinging beam of radiation than the portions of the track intermediate the spaced indicia;
   wherein each information track records a modulated carrier signal and a pilot signal, the pilot signal having a prescribed frequency substantially lower than a substantial portion of the frequency components of the modulated carrier signal;
   wherein the duty cycle of the spaced indicia forming each information track varies in accordance with the phase angle of the pilot signal;
   and wherein the phase angle of the pilot signal is aligned with itself on adjacent information tracks.

3. A recording medium as defined in claim 2, wherein:
   the body is disc-shaped and the plurality of information tracks are substantially circular and concentrically arranged; and
   an integral number of cycles of the pilot signal are recorded on each track.

4. A recording medium as defined in claim 2, wherein the body is light-reflective and the spaced indicia forming each information track are regions of reduced reflectivity.

* * * * *